(12) United States Patent
Devine

(10) Patent No.: US 6,250,866 B1
(45) Date of Patent: Jun. 26, 2001

(54) SELF-DRILLING, SELF-TAPPING SCREW FOR CONCRETE BLOCKS

(75) Inventor: Richard C. Devine, Southwick, MA (US)

(73) Assignee: Olympic Manufacturing Group, Inc., Agawam, MA (US)

( * ) Notice: Subject to any disclaimer, the term of this patent is extended or adjusted under 35 U.S.C. 154(b) by 0 days.

(21) Appl. No.: 09/502,276

(22) Filed: Feb. 11, 2000

(51) Int. Cl.⁷ .............................. F16B 25/00; F16B 35/04
(52) U.S. Cl. .................. 411/387.4; 411/412; 411/426
(58) Field of Search ............................... 411/387.1, 387.2, 411/387.3, 387.4, 387.5, 412, 413, 426; 29/456

(56) References Cited

U.S. PATENT DOCUMENTS

| | | | |
|---|---|---|---|
| 3,207,023 | * 9/1965 | Knohl | 411/412 X |
| 4,034,641 | * 7/1977 | Williams, Jr. et al. | 411/387.2 |
| 4,439,077 | * 3/1984 | Godsted | 411/412 X |
| 5,061,136 | * 10/1991 | Dixon et al. | 411/412 |

* cited by examiner

*Primary Examiner*—Neill Wilson
(74) *Attorney, Agent, or Firm*—Alix, Yale & Ristas, LLP

(57) ABSTRACT

A self-drilling, self-tapping screw for concrete blocks which includes a shank having a proximal portion equipped with a double lead, self-tapping spiral thread and an unthreaded portion which connects the threaded shank portion to a carbide drill tip in an axially spaced relationship. The length of the unthreaded portion of the shank is selected to allow the drill tip to form a clearance hole extending through the concrete block prior to engagement of the threaded shank portion with the clearance hole.

12 Claims, 3 Drawing Sheets

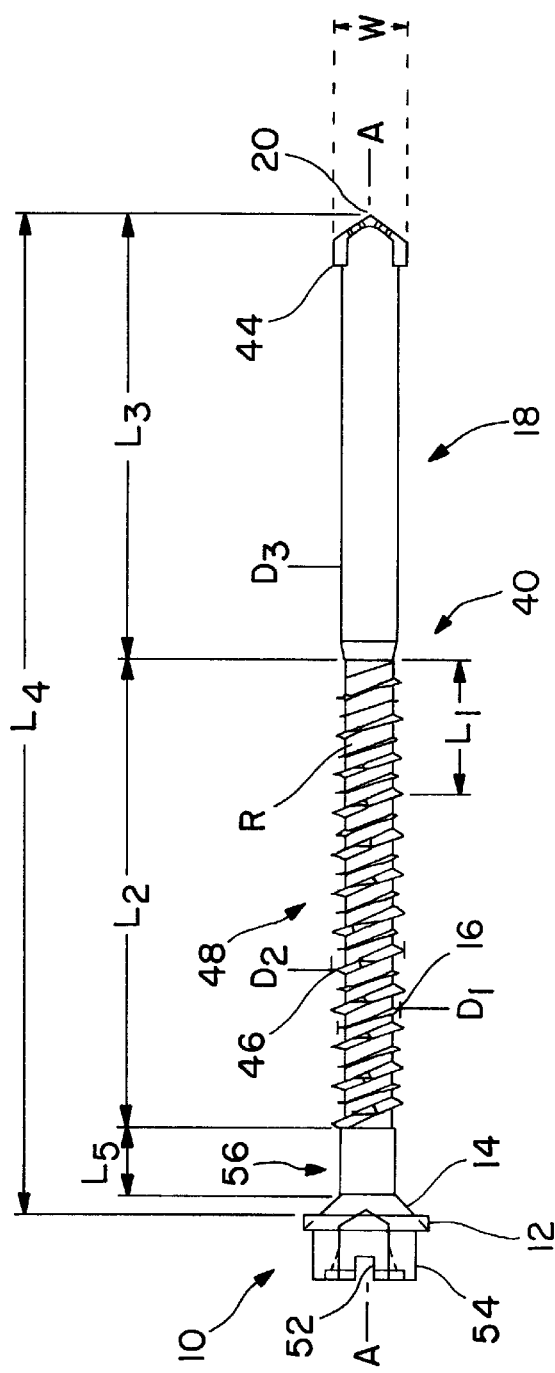
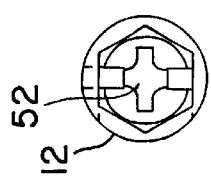
FIG. 1
FIG. 2

SELF-DRILLING, SELF-TAPPING SCREW FOR CONCRETE BLOCKS

BACKGROUND OF THE INVENTION

The present invention relates generally to attaching materials to concrete substrates. In particular the present invention relates to a self-drilling, self-tapping screw for light concrete blocks.

Concrete is a hard and friable substance difficult to penetrate and engage with a threaded fastener. The properties of concrete conventionally dictate that a clearance hole be provided before any fastener may be affixed to the concrete. Conventionally, when fastening an item to concrete block one typically first uses a carbide tipped drill to provide a clearance hole before a self-tapping fastener can be installed. After the hole is drilled with a drill bit in a hammer drill, a screw gun is used to install the screw. In some applications, a lead or plastic insert may be placed in the clearance hole before the screw is installed. While this process works well, it may be characterized by relatively high labor and material costs because the process involves several steps, multiple tools and frequently the handling and installation of multi-piece fasteners.

U.S. Pat. No. 4,034,641 to Williams et al discloses one type of self-drilling anchor to which the present invention generally relates. The self-drilling anchor has a driving head, a shank having a threaded portion and an unthreaded portion and a drill tip. A conventional drill tip at the end of the shank is defined by a taper and flutes. The unthreaded portion of the shank is forged in a configuration having major and minor diameters.

A drill tip capable of reliably penetrating concrete must be made of material having a hardness which typically renders the material too brittle to be used for the driving and holding functions required of the shank and head portions of the fastener. The unitary fastener composition of conventional related fasteners must compromise either the hardness constraints of the drill tip or the durability constraints of other parts of the fastener often leading to mechanical failure at either the head or shank or to an unnecessarily expensive fastener.

SUMMARY OF THE INVENTION

Briefly stated, the invention in a preferred form is a self-drilling, self-tapping screw for light concrete blocks or other such concrete substrates of limited thickness. The present invention is a one-piece drill/fastener combination constructed of a unitary piece of steel which mounts a carbide drill tip. The fastener is composed of a head and a specially configured shank extending from the underside of the head to the drill tip. The shank has a threaded portion adjacent the head and an unthreaded portion extending from the threaded portion to a distal slot for holding a carbide drill tip. The head is adapted for rotational engagement with a driving tool and includes a radially enlarged flange for bearing against the material to be fastened. The threaded portion of the shank includes dual diameter threads which are capable of forming and mating with grooves in the clearance hole. The distal end of the unthreaded portion of the shank provides a location for mounting the carbide drill tip in an axially spaced relationship to the threaded portion of the shank. The length of the unthreaded portion of the shank is preferably at least equal to the thickness of the concrete substrate.

More particularly, the length of the unthreaded portion of the shank is selected such that the drill tip can fully penetrate the concrete substrate prior to the threaded portion engaging the clearance hole. This relationship is significant because the axial progress of the self-drilling tip through the concrete will vary depending on the hardness of the material being drilled, the amount of pressure axially exerted on the drill tip and the rotational speed of the drill tip. In contrast, the axial progress of the threaded portion of the shank through the concrete substrate is determined by the slope of the threads and the rotational speed of the shank.

Simply put, if the hole is not completely drilled through the concrete substrate prior to threaded engagement with the clearance hole, the threads will attempt to force the drilling tip through the concrete substrate at an axial rate faster than the drill tip is capable of penetrating the concrete substrate. The axial and rotational forces presented by such a mismatch will lead to mechanical failure of the fastener or failure of threaded engagement with the concrete substrate (stripping of the threads).

This invention thus allows the boring of a clearance hole and installation of a concrete fastener in one step producing significant material and labor savings. The steps of drilling a clearance hole and installing a fastener are combined into one operation requiring one installation tool and one piece of hardware. The invention is specifically adapted for use with light concrete blocks, it is equally applicable to affixing materials to any type of masonry, stone or other such substance having a predetermined thickness.

An object of the present invention is to provide a new and improved fastener for concrete blocks which eliminates labor intensive steps and creates significant labor savings.

A further object of the present invention is to provide a new and improved fastener for concrete substrates which eliminates material and tool costs of installation.

A yet further object of the present invention is to provide a self-drilling, self-tapping screw for concrete substrates which permits the drilling of a clearance hole and installation of a fastener in the clearance hole in one step.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings in which:

FIG. 1 is a side elevational view, partly in schematic, of a self-tapping, self-drilling screw in accordance with the present invention;

FIG. 2 is an end elevational view, partly in schematic, of the head of a self-drilling, self-tapping screw constructed according to the present invention;

DETAILED DESCRIPTION OF THE PREFERRED EMBODIMENT

Figure 3:
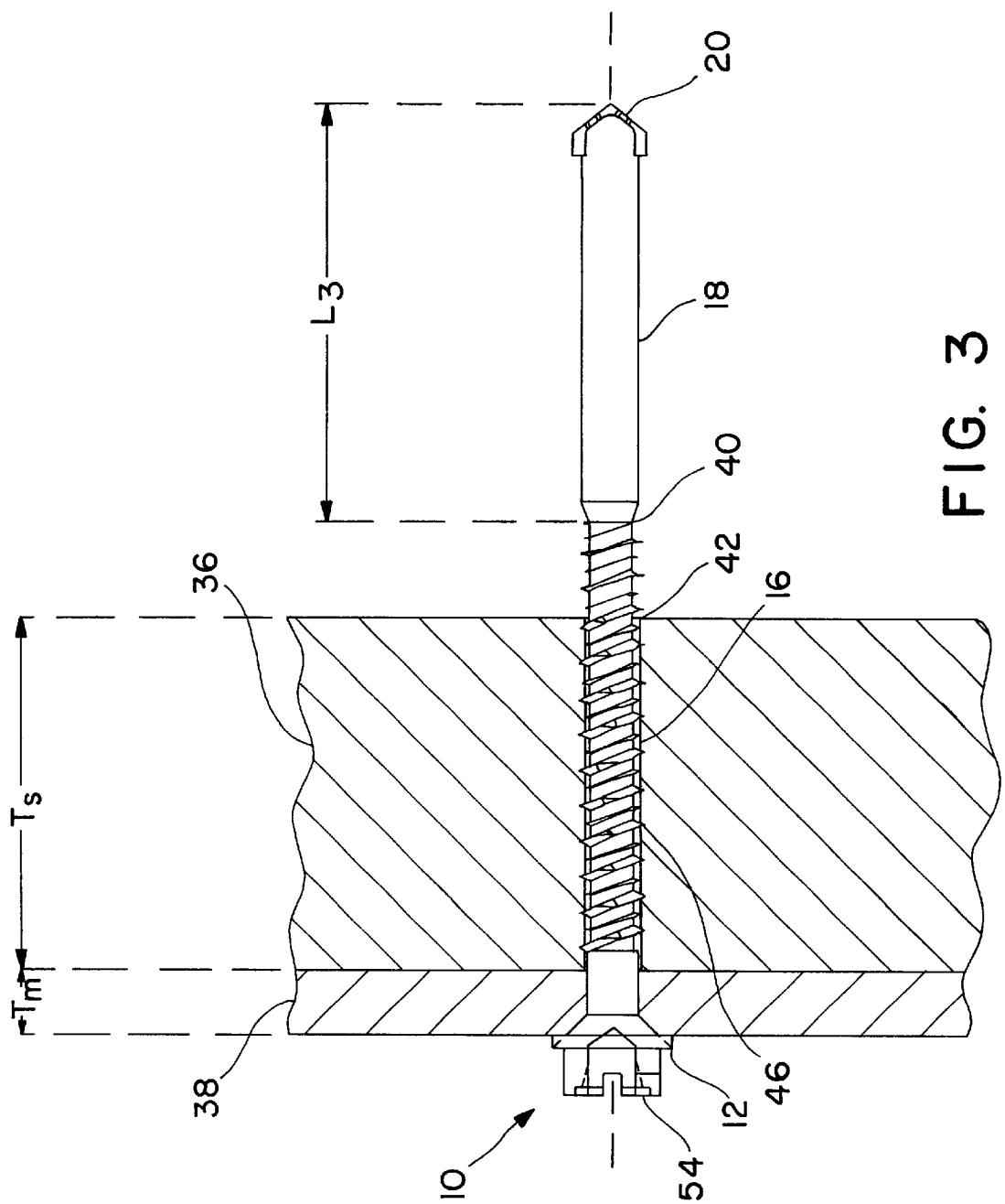
FIG. 3 is a side elevational view of the fastener of FIG. 1 illustrated in an installed configuration fastening a material to a concrete substrate.

With reference to the drawings, wherein like numerals represent like parts throughout the several figures, a self-drilling, self-tapping screw for concrete blocks is generally designated by the numeral 10. Screw 10 is particularly adapted to fastening materials to hollow concrete substrates such as concrete block in an integrated one-step process that does not require a separate drilling step prior to installation of the fastener. The screw has particular applicability to light concrete, such as concrete blocks with a wall thickness of 1.5 inches or less.

Referring in particular to FIG. 1, the self-drilling, self-tapping screw 10 has a head 54, a shank 40 and drill tip 20. The shank 40 integrally extends from the head 54 and defines the axis A of the screw 10. A first portion 56 of the shank, closest the head 54, is unthreaded. A second portion 48 of the shank is provided with a dual diameter, self tapping spiral thread 16, 46. A third portion 18 of the shank is unthreaded and extends from the threaded second portion 48 to a distal tip 20 where a slot 58 is formed to accommodate the insertion of a carbide drill tip 44.

In a preferred embodiment, illustrated in FIGS. 1–6, the head 54 is provided with a radially extending circular flange 12. One side of the flange 12 is provided with structures 52 capable of mating with slotted, phillips or hexagonal drivers for application of rotational and axial forces to the fastener. The underside of the flange 12 opposite the driving structures 52 provides a surface for bearing against the material 38 to be fastened. A tapered conical section 14 extends axially from the underside of the flange 12 connecting the head 54 to the unthreaded first portion 56 of the shank 40.

The second portion 48 of the shank 40 is provided with a double lead, spaced thread configuration including a first thread helix 16 of a given diameter $D_1$ and a second thread helix 46 of a greater diameter $D_2$. Helix 16 and Helix 46 have an equal root diameter R. As the second portion 48 approaches the third portion 18 of the shank, both thread helix diameters $D_1$, $D_2$ are reduced by a taper of 6° over a distance $L_1$ representing approximately 30% of the threaded length $L_2$ of the proximal portion 48. To facilitate tapping of mating grooves into the interior surface of a clearance hole, notches (not illustrated) may be formed in the crest of the high thread. The maximum diameter $D_2$ of the second thread helix 46 is selected so that the second thread helix 46 forms grooves in and threadably engages the interior surface of the clearance hole 42.

The unthreaded third portion 18 of the shank 40 extends along the screw axis A from the second portion 48 to the distal tip 20. The distal tip 20 is provided with an axial slot 58 for brazing a carbide drill tip 44 to the shank 40. The installation of a carbide drill tip 44 allows the remaining material of the fastener 10 to have the strength and durability needed for drilling, tapping and holding while the carbide drill tip provides the requisite extremely hard tool edges for penetrating the sand, stones or other material of varying hardness found in aggregate masonry products like concrete block or brick.

The length $L_3$ of the third portion 18 of the shank 40 is chosen so that the clearance hole will be drilled entirely through the substrate 36 prior to the threaded second portion 48 of the shank 40 engaging the clearance hole 42.

Dimensions for one example of the screw 10 that is manufactured from steel, heat treated and provided with a carbide tip are set forth in Table 1 below (dimensions in inches):

TABLE 1

| | |
|---|---|
| shank length $L_4$ | 3.465 |
| shank first portion length (unthreaded) $L_5$ | .365 |
| shank second portion length (threaded length) $L_2$ | 1.600 |
| thread root diameter R | .175 |
| high thread diameter $D_2$ | .260 |
| low thread diameter $D_1$ | .205 |
| length of 6° taper on threads $L_1$ | .480 |
| shank third portion length (unthreaded length) $L_3$ | 1.500 |
| shank third portion diameter $D_3$ | .189 |
| head flange diameter | .432 |
| carbide tip width W | .250 |

It will be apparent to those skilled in the art that the axial advancement of the fastener in its drilling mode will vary according to the hardness of the material being drilled, the rotational speed of the drill tip, and the axial force applied by the installation tool, among other factors. The axial progress of the threaded second portion 18 of the shank 40 through the concrete substrate 36 is determined by the slope of the threads 16, 46 and the rotational speed of the shank. The difference between these axial rates of progress can be significant, making it critical that the clearance hole 42 be completed and the shank 40 be allowed to exit the opposite side of the concrete substrate 36 prior to engagement of the threaded second portion 48 of the shank 40. Completing the clearance hole 42 allows the threaded second portion 48 of the shank 40 to engage the interior surface of the clearance hole 42 and advance at a speed independent of the drilling operation. Threaded engagement with the clearance hole, which otherwise might have been disrupted by the different rates of axial progress of the drilling and threading operations, may now proceed in an efficient and effective manner.

The result is a single-step concrete fastener installation which produces significant labor and material savings. No drill bits are needed, no drill is needed, a single purpose driver that will allow rotational and axial forces to be applied to the fastener is all that is required.

FIG. 3 illustrates a screw 10 of the present invention in an installed configuration. The screw 10 is shown installed in a clearance hole 42 with the shank 40 completely penetrating the concrete substrate 36 and the material to be fastened 38. The head 54 compressively engages the material to be fastened 38 against the concrete substrate 36. The tapered conical section 14 centers the shank 40 in the opening in the material 38 to be fastened. The unthreaded first portion 56 of the shank allows the screw 10 to rotate freely in the opening in the material 38 to be fastened, allowing that material 38 to be compressed tightly against the substrate 36.

The threaded second portion 48 of the shank engages the interior surface of the clearance hole 42. It can be seen from FIG. 4 that the length $L_3$ of the third portion 18 of the shank 40, is equal to the length of the sum of the thicknesses $T_s$ of the concrete substrate 36 and the material 38 to be fastened $T_m$. This allows the drilling tip 20 to completely penetrate the concrete substrate 36 prior to the threaded second portion 48 engaging the clearance hole 42.

Figure 6:
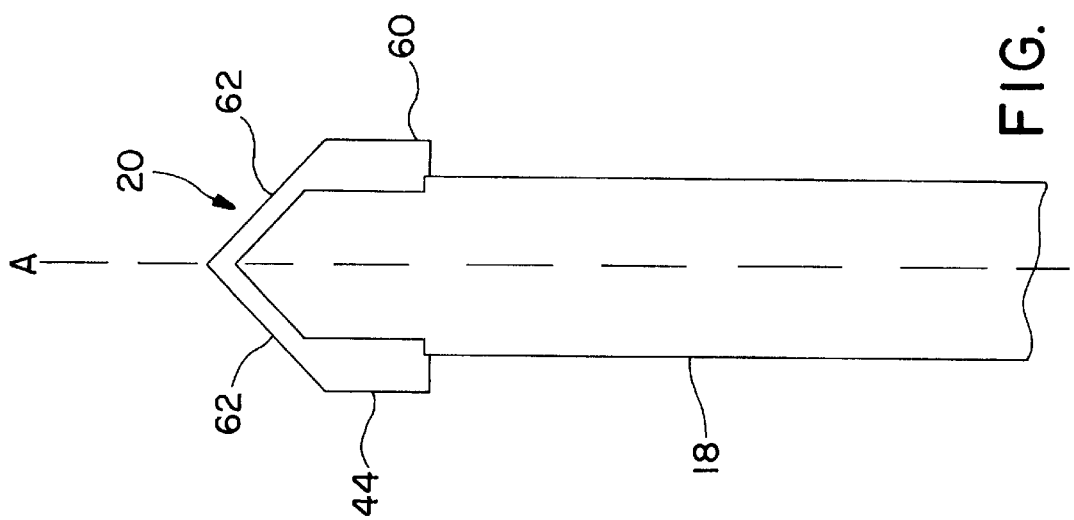
FIG. 6 is a schematic view of the fastener of FIG. 4 rotated 90° on its axis.
Figure 5:
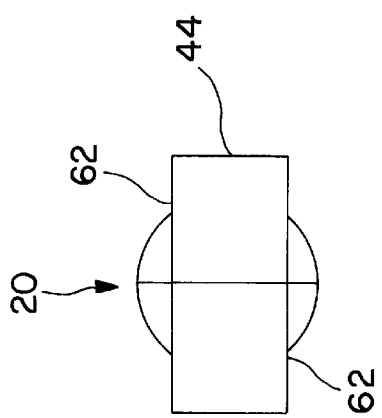
FIG. 5 is a schematic view of the fastener of FIG. 4 as seen from the distal end thereof.
Figure 4:
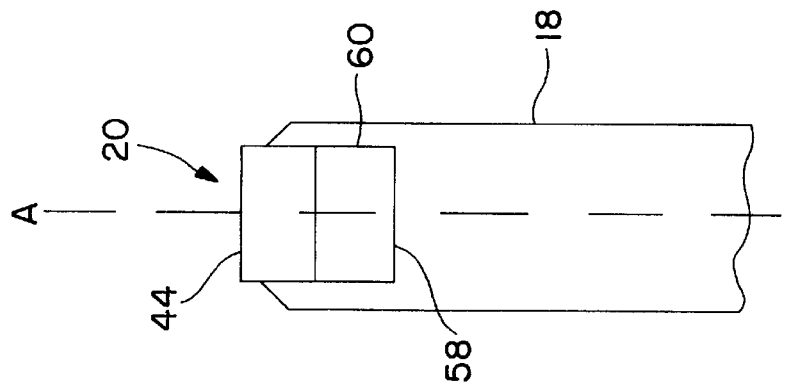
FIG. 4 is a schematic side view of the distal tip of the fastener (partially illustrated), slot and carbide insert.

FIGS. 4–6 illustrate the configuration of the third portion 18 of the shank, the distal slot 58 and the carbide insert 44 positioned in the slot forming the distal tip 20. A slot 58 through the axis A of the third portion of the shank 18 is sized to receive the square base portion 60 of the carbide insert 44. Angled cutting edges 62, opposite the base portion 60, converge at an obtuse vertex angle at the screw axis A to thereby define the drill tip.

While preferred embodiments have been shown and described, various modifications and substitutions may be made thereto without departing from the spirit and scope of the invention. Accordingly, it is to be understood that the present invention has been described by way of illustration and not limitation.

I claim:

1. A self-drilling, self-tapping screw for concrete blocks, comprising:

a head including a coupler for coupling with a driving tool, a retainer flange and a tapered conical section projecting axially from said flange opposite said structures, a shank integrally extending from said tapered conical section and defining a screw axis, said shank having an unthreaded first portion adjacent said tapered conical section, a second portion including a first spiral thread having a first outer diameter and a second spiral thread having a second outer diameter, said second outer diameter smaller than said first outer diameter and a root diameter, an unthreaded third portion having a length of at least one inch, an outer diameter greater than the root diameter of said second portion but less than said second outer diameter, and terminating in a distal tip having an axial slot, and a carbide insert having a base portion and opposed cutting edges, said insert secured in said slot with said base portion facing said shank and said cutting edges forming a drill tip, wherein said first and second outer diameters taper toward said root diameter over approximately 30% of said second portion adjacent to said third portion.

2. The screw of claim 1, wherein said cutting edges converge at an obtuse vertex angle at said axis.

3. The screw of claim 1, wherein said third portion of said shank has a length equal or greater than the thickness of a material to be penetrated by said screw.

4. The screw of claim 2, wherein said first outer diameter is approximately 0.260 inches and said drill tip has a width of approximately 0.250 inches.

5. A self-drilling, self-tapping screw and substrate assembly comprising:

a concrete substrate having a first outer and second inner surfaces spaced by a thickness T, said substrate defining an opening extending from said first surface to said second surface, a material disposed in surface-to-surface relationship against said first outer surface;

a screw including:

a driving head having a radially enlarged retaining flange and a tapered conical section axially projecting opposite said driving head;

a shank integrally extending from the tapered conical section and defining a screw axis, said shank having an unthreaded first portion, a threaded second portion including a first spiral thread having a first outer diameter and a second spiral thread having a second outer diameter, said second outer diameter smaller than said first outer diameter and a root diameter, an unthreaded third portion having an outer diameter greater than said root diameter but less than said second outer diameter and a length equal to or greater than T, and terminating in a distal tip having an axial slot; and a carbide insert secured in said slot to form a drill tip;

wherein said screw is disposed in said opening, said thread engaging said substrate adjacent said opening, said head flange engaging said material and said distal tip spaced from said second inner surface a distance greater than or equal to T.

6. The assembly of claim 5, wherein said carbide insert includes a base portion secured in said slot and two angled cutting edges opposite said base portion which converge at an obtuse vertex angle at said axis.

7. The assembly of claim 6, wherein said carbide insert has a radial width of approximately 0.250 inches.

8. The assembly of claim 5, wherein said shank has a diameter of approximately 0.189 inches and a root diameter of approximately 0.175 inches.

9. The assembly of claim wherein said first diameter is approximately 0.260 inches and said second diameter is approximately 0.205 inches.

10. The assembly of claim 5, wherein said first and second outer diameters taper toward said root diameter over approximately 30% of said second portion adjacent to said third portion.

11. The assembly of claim 5, wherein said first and second spiral threads have a self-tapping configuration in which each thread gradually increases in outer diameter from a minimum where said second portion joins said third portion, said first and second spiral threads reaching their respective first and second outer diameters over an axial distance equal to approximately 30% of an axial length of said second portion.

12. A method for fastening material to concrete substrates having a given thickness comprising the steps of:

providing a fastener having a head, a shank integrally extending from the head and terminating in an axial slot and defining an axis thereof, the shank having an unthreaded first portion, a second portion including a first spiral thread having a first outer diameter and a second spiral thread having a second outer diameter, said second outer diameter smaller than said first outer diameter and an unthreaded third portion, said third portion connecting said second portion to said slot, a carbide tip being secured in said slot forming a drill tip;

placing the material adjacent to the concrete substrate;

drilling a first opening in the material to be fastened with the drill tip of the fastener by applying a torque to the fastener head;

drilling a second opening in said concrete substrate with the drill tip by applying a torque to the head whereby, said drill tip passes through the concrete substrate before said second threaded portion engages said material to be fastened; and engaging the thread on the second portion of said shank with said material to be fastened;

advancing said fastener through said material to be fastened by rotating said fastener about said fastener axis;

threadably engaging a portion of the thread on the second portion of said shank with said concrete substrate; and advancing said fastener through said concrete substrate and said material to be fastened, whereby said head engages said material to be fastened and said material is clamped between said head and said concrete substrate.

* * * * *